united States Patent [19]

Walsh

[11] Patent Number: 4,534,317

[45] Date of Patent: Aug. 13, 1985

[54] PROCEDURES FOR MONITORING FISH FOOD CONSUMPTION

[75] Inventor: Myles A. Walsh, Falmouth, Mass.

[73] Assignee: Cape Cod Research, Buzzards Bay, Mass.

[21] Appl. No.: 645,788

[22] Filed: Aug. 30, 1984

[51] Int. Cl.$^3$ ............................................. A01K 61/00
[52] U.S. Cl. .................................... 119/51 R; 119/2; 119/3; 426/2
[58] Field of Search ......................... 119/51 R, 2, 3, 4; 426/2

[56] References Cited

U.S. PATENT DOCUMENTS 4,133,294 1/1979 Bolton et al. ............................ 119/4
4,198,924 4/1980 Chapman ................................ 119/2
4,399,769 8/1983 Casey ..................................... 119/3

Primary Examiner—Hugh R. Chamblee

[57] ABSTRACT

Procedures for feeding fish or crustaceans are disclosed which make possible monitoring the extent to which the administered food is actually eaten. These procedures utilize fluorescent dyes which are commingled with the food in order by their release into the culture water to indicate the extent to which the feed is being eaten. By administering food containing fluorescent dyes which when eaten cause the culture water to fluoresce, a direct measure of the food eaten is achieved. By administering food containing fluorescent dyes which when not eaten cause the culture water to fluoresce, a direct measure of the extent of wasteful overfeeding is achieved. By administering food containing both types of fluorescent dyes simultaneously, and measuring the ratio of their fluorescences, a sensitive measure of feeding activity is achieved.

14 Claims, No Drawings

PROCEDURES FOR MONITORING FISH FOOD CONSUMPTION

ORIGIN OF THE INVENTION

The Government of the United States has certain rights in this invention pursuant to Grant BSR-8360060 awarded by the National Science Foundation.

TECHNICAL FIELD

This invention relates to procedures for monitoring the feeding activity of fish or crustaceans. More specifically, the invention is directed to methods for indicating whether food administered to the culture water is actually being eaten by the culture, thereby permitting adjustments that reduce the amount of food wasted while allowing optimum growth of the culture.

BACKGROUND ART

Fish, prawn, lobster or shrimp husbandry under a controlled environment, sometimes referred to as aquaculture, offers numerous advantages which are by now well known. Some of these advantages are the ability to provide large quantities of good quality high protein food at relatively low cost, the opportunity to regularize the supply of gourmet fish subject in nature to seasonal fluctuations and the ability to conduct operations at inland locations thereby increasing the availability of fish and crustaceans to residents located far from the coastline.

Such commercial potential has stimulated interest in aquaculture and it has been discovered experimentally that confined fish under continuous visual monitoring of feeding activity can convert 0.9 pounds of dry feed to 1.0 pounds of fresh fish. These laboratory results are not, however, experienced at commercial fish farms. Because of the inability to monitor feeding activity of species which typically bottom feed, a feed conversion ratio of 1.9 pounds of dry feed to 1.0 pounds of fresh fish is considered an excellent commercial result. Since the cost of the feed typically represents more than one half of the cost of the fish husbandry, it would be very advantageous to improve the feed conversion ratio by directly monitoring feeding activity and only feeding the culture to satiation.

Despite the economic importance of the feed conversion ratio, currently known fish farming methods do not include a process for quantitatively monitoring the food actually consumed by the culture. When fish will feed at the surface, the farmer can observe the crop regularly and gain some sense of survival and growth, especially if a floating food pellet is used to encourage surface feeding. However, many commercially useful species such as shrimp, prawns, lobsters and catfish feed slowly and continuously and require a sinking feed with considerable stability when submerged. For these cases, the amount of feed required is an educated guess and wasted feed is the primary cause of poor conversion in commercial aquacultures.

Excess food accumulation also depletes oxygen since oxygen in water is consumed in the decomposition of wasted food. Numerous methods are employed to remove the food through suction sweepers and flow through of water in order to prevent disease and death of the culture. These are expensive and do little to improve feed conversion ratio.

Problems of a similar nature are experienced in the raising of tropical fish where it often becomes necessary for the owner to be away from the aquarium for an extended period of time. During this time it is necessary to feed the fish to keep them alive. Previously known processes have employed timing structures which dispense food at intervals largely unrelated to the actual consumption of the food. Overfeeding or underfeeding over periods of weeks has resulted in loss of expensive fish. Currently known methods do not include a method for determining whether food administered to an aquarium is actually being eaten and for using this information to vary the amount of food administered to suit the long-term needs of the aquarium.

It is an object of the invention to overcome the objections to the proir art processes and provide a simple method for monitoring the consumption of food by aquatic creatures, especially fish and crustaceans, and thereby provide the information necessary for varing the amount of food administered periodically to said creatures for their optimum health and growth.

It is a further object of the invention to provide a sensitive indicator of whether a culture has been fed to satiation and to thereby reduce the amount of feed typically wasted during the feeding of aquacultures.

STATEMENT OF THE INVENTION

These objects are accomplished by including fluorescent dye(s) in the food fed to the aquaculture, feeding this spiked food to a culture of fish or crustaceans, and monitoring the changes in fluorescence of the culture water that result from the timed release(s) of said dye(s) to the culture water.

The usual aquaculture feed is a composite material, oftentimes consisting of pellets or flakes made by pressing together a variety of nourishing materials to assure a balanced diet. It the preferred form, the spiked food of this invention is formed in a similar manner except that very small quantities of said fluorescent dyes are intimately commingled with large quantities of fluent food stuffs prior to the pressing of flakes or pellets.

Said fluorescent dyes may be in the form of fine powders, may be encapsulated in water-insoluble materials, or may be employed dissolved in fine droplets of edible fats or oils. Encapsulation is preferred for those dyes with large solubility in water.

Encapsulation is a coating technology that is well recognized and a myriad of encapsulation processes exist, especially for use in the delivery of water-soluble chemicals at a controlled rate to aqueous media. Its known applications have been the subject of thorough reviews, see for example: Curt Thies, "Microcapsules as Drug Delivery Devices", Critical Reviews in Biomedical Engineering, Volume 8, Issue 4, 335–381, CRC Press, 1982. The gelatin/gum arabic encapsulation process is preferred for its versatility and because the solubility of the contents of the resulting microcapsules can be tailored over wide ranges by treating the gelatin/gum arabic with various amounts of formaldehyde or glutaraldehyde.

The following gives the specifications of the preferred physical parameters of the capsules in accordance with this invention:

| Specifications of Capsules | |
|---|---|
| Mean Capsule Size | Small compared to the size of the food pellet or flake |
| Theoretical Dye Payload | Less than 33 wt % |
| Dye | Any inexpensive, non-toxic, |

| Specifications of Capsules | |
|---|---|
| | biodegradable dye which strongly fluoresces below 700 nm |
| Encapsulation Material | Water insoluble, inexpensive, non-toxic, and edible. |
| Physical Characteristics | Free flowing powder. |

Capsules made according to said specifications are commingled with fluent food ingredients and the mixture formed into pellets or flakes.

The ratio of commingled fluorescent dye(s) to food is typically by weight less than 15 parts per million, although higher levels may be preferred for aquarium applications in order to reduce the cost of the electronics required to detect changes in fluorescence of the aquarium water. When encapsulation is employed to reduce the release rate of uneaten dyes, theoretical payloads of less than 33% are preferred. The spiked food is administered to the aquaculture, the culture water exposed to light near the maximum excitation wavelengths(s) of the fluorescent dye(s), and the fluorescence of said water monitored at the emission wavelength(s) of the encapsulated dye(s). Low cost, compact filter fluorometers that feature sensitivity of 15 parts per trillion are commercially available for this purpose. (For example, Model 450 Fluorometer, Sequoia-Turner Corporation, Mountain View, CA.) Commercial fluorometers of this type use two filters to filter the light from inexpensive, broad-spectrum light spources and to high gain photomultipliers. The measured intensity of the fluorescence is typically directly proportional to the concentration of a particular dye and is indicted by means of a digital meter or an analog output.

Continuously monitoring the fluorescence of the culture water after administering a pre-determined amount of food, surprisingly permits according to the invention the direct monitoring of feeding activity the utilizing two distinctly different but extremely useful chemical phenomenon.

A number of dyes are chemically changed on digestion and no longer fluoresce. By way of example but not by way of limitation, a preferred dye, umbelliferone (7-hydroxycoumarin, The Merck Index, Mon. No. 9503, 9th Ed.), shows a very strong blue fluorescence at 440 nm when excited at 340 nm. However, umbelliferone is converted to a non-fluorescent form when eaten by fish or crustaceans. Because of its great water solubility, umbelliferone must be encapsulated in order to give the culture sufficient time t eat the spiked food before large amounts of umbelliferone dissolve into the culture water. Uneaten encapsulated dyes of this type dissolve into the culture water over periods of hours and cause a change in fluorescence intensity in proportion to the amount of food uneaten.

A number of encapsulated dyes become more fluorescent on the mastication, digestion and elimination of the spiked food. By way of example but not by way of limitation, tetracycline, 6,7-dihydroxycoumarin 6-glucoside, fluorescein and the like are preferred for their extremely intense fluorescence in water and because their use does not affect taste, appearance, or acceptability of the fish flesh for human consumption. For example, a preferred dye fluorescein (The Merk Index, Mon. No. 4040, 9th Ed.) is water insoluble. However, on mastication in culture water according to the invention, fluorescein is converted to the ionic form (Ibid., Mon. No. 4042) which is freely soluble in water, and has an absorption maximum at 493.5 nm with an intense yellowish-green fluorescence perceptible down to a dilution of 20 ppb by the naked eye and 10 ppt by a fluorometer. Encapsulated dyes of this type dissolve into the culture water as the food is masticated and cause a change in fluorescence intensity in proportion to the amount of food eaten.

Those with ordinary skill in the art will be able to select light sources with appropriate intensities and excitation wavelengths and to select appropriate filters to limit measured light to wavelengths near the fluorescence maximum(s) of the dye(s) chosen. Those with ordinary skill will be able to directly measure these emission levels and use these measurements to either manually or automatically control the timing and/or amount of food administered per feeding so as to deliver to the culture the optimum amount of nourishment.

For applications in which water flows past the aquaculture, such as cage and raceway cultures, it is desirable to spike the food with both types of dyes and monitor the ratio of the fluorescences of said dyes at their respective peak emission wavelengths. This ratio is a sensitive measure of the eating habits of the culture, while the absolute levels of the fluorescences are not because said absolute levels both vary in proportion to the inverse of the volume flow rate, a rate that typically varies with time.

For aquacultures in which the culture water remains substantially the same, such as pond cultures and aquariums, it is important that the dye levels not build up to levels large compared to changes in level due to feeding activity. In aquarium cultures, an activated charcoal filter achieves this purpose. However, for pond cultures, the preferred dyes according to this invention substantially biodegrade in the matter of a day or two.

Most aquacultures contain chlorophyll suspended in algae, leaves and plant materials. This material fluoresces in the red region. Thus in order to avoid this natural interference, it is preferred that the dyes chosen according to this invention fluoresce at wavelengths shorter than red light.

It is understood that, while the invention has been described in detail with specific embodiments, various changes and modifications thereof within the skill of the art may be made and that all such changes and modifications are intended to be within the scope of the following claims.

I claim:

1. A method for determining the proper amount of food for consumption by a culture of fish and/or crustaceans comprising the steps of:

a. spiking food with non-toxic fluorescent dyes;
   b. administering a pre-determined amount of said spiked food to said culture;
   c. allowing sufficient time for said spiked food to be eaten;
   d. exposing water from said culture to light near or at the maximum absorption wavelength of said dye(s);
   e. measuring the intensity of the fluorescence of said culture water at or near the maximum emission wavelength(s) of said fluorescent dye(s); and,
   f. adjusting the amount of food administered to said culture, according to said measurement(s).

2. The method of claim 1 wherein said fluorescent dye(s) are selected from the group consisting of fluorescein, umbelliferone, 6,7-dihydroxycoumarin 6-glucoside, and tetracycline.

3. The method of claim 1 wherein said spiking is accomplished by encapsulating said fluorescent dyes with non-toxic, water insoluble, and edible material; commingling said capsules with food stuffs; and forming said mixture into flakes or pellets.

4. The method of claim 1 wherein said spiking is accomplished by mechanically stirring together fine powders of said dye(s) with food stuffs; and forming said mixture into flakes or pellets.

5. The method of claim 1 wherein said spiking is accomplished by dissolving said fluorescent dye(s) in edible fats or oils; commingling said solution with food stuffs; and forming said mixture into flakes or pellets.

6. The method of claim 1 wherein said fish are edible catfish and salmonids.

7. The method of claim 1 wherein said crustaceans are edible shrimps, prawns, or lobsters.

8. The method of claim 1 wherein said culture occupies an aquarium.

9. A method for determining whether or not food administered to a culture of fish and/or crustaceans is actually being eaten by said culture, said method comprising the steps of:

a. spiking food with at least two non-toxic fluorescent dyes, where at least one of said dyes becomes less fluorescent on being eaten by said culture;
b. administering a pre-determined amount of said spiked food to said culture;
c. exposing water from said culture to light containing the excitation wavelengths of said dyes; and,
d. monitoring the ratio(s) of the intensities of the fluorescences of said dyes.

10. The method of claim 9 wherein said dyes are fluorescein and umbelliferone.

11. The method of claim 9 wherein spiking is accomplished by encapsulating said fluorescent dyes; commingling said capsules with food; and forming said mixture into flakes or pellets.

12. The method of claim 9 wherein said spiking is accomplished by dissolving said fluorescent dyes in edible fats or oils; commingling said solution with food stuffs; and forming said mixture into flakes or pellets.

13. The method of claim 9 wherein said spiking is accomplished by commingling fine powders of said dyes with food stuffs; and forming said mixture into pellets or flakes.

14. The method of claim 9 wherein said culture is enclosed in a cage or raceway.

* * * * *